Dec. 15, 1953 T. Q. ELIOT ET AL 2,662,847
METHOD FOR DISTILLATION OF CYCLOPENTANONE FROM
2-METHYL-1-BUTANOL AND 3-METHYL-1-BUTANOL
Filed April 23, 1952 2 Sheets-Sheet 1

THEODORE Q. ELIOT
JOE C. WEAVER JR.
INVENTORS

ATTORNEY

Dec. 15, 1953  T. Q. ELIOT ET AL  2,662,847
METHOD FOR DISTILLATION OF CYCLOPENTANONE FROM
2-METHYL-1-BUTANOL AND 3-METHYL-1-BUTANOL
Filed April 23, 1952  2 Sheets-Sheet 2

THEODORE Q. ELIOT
JOE C. WEAVER JR.
INVENTORS

BY *Arthur McElroy*

ATTORNEY

Patented Dec. 15, 1953

2,662,847

UNITED STATES PATENT OFFICE 2,662,847

METHOD FOR DISTILLATION OF CYCLO-PENTANONE FROM 2-METHYL-1-BUTA-NOL AND 3-METHYL-1-BUTANOL

Theodore Q. Eliot, Tulsa, Okla., and Joe C. Weaver, Jr., Brownsville, Tex., assignors to Stanolind Oil and Gas Company, Tulsa, Okla., a corporation of Delaware Application April 23, 1952, Serial No. 283,948

9 Claims. (Cl. 202—39.5)

The present invention relates to a method involving novel conditions for separating alcohols from close boiling ketones. More particularly, it pertains to the separation of cyclopentanone from 2-methyl-1-butanol and/or 3-methyl-1-butanol.

Figure 1:
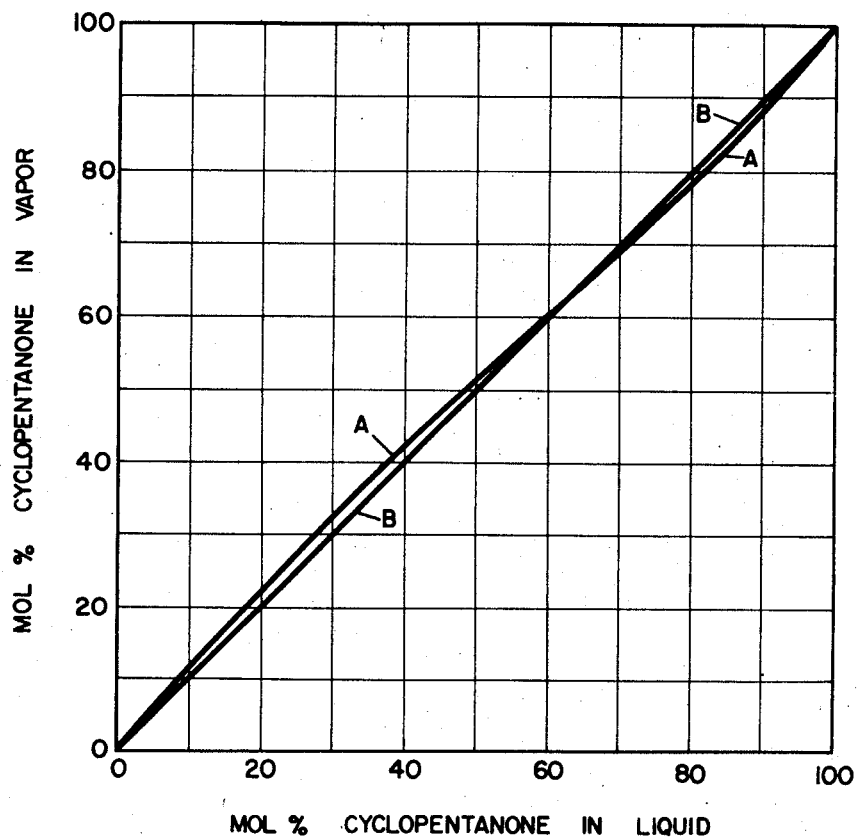

In the accompanying drawing, Figure 1 is an equilibrium diagram for cyclopentanone and 3-methyl-1-butanol under anhydrous conditions.

Figure 2:
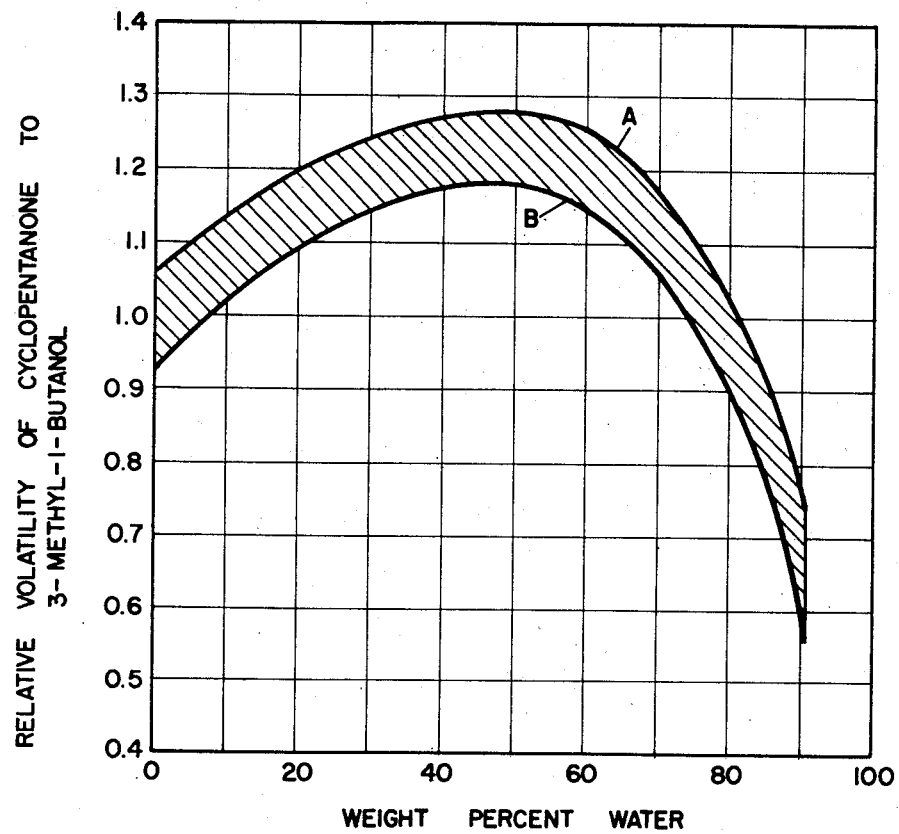

Figure 2 is a graph showing the relative volatility of cyclopentanone relative to 3-methyl-1-butanol at various concentrations of water.

2-methyl-1-butanol and 3-methyl-1-butanol which boil at 128.9° and 131.85° C., respectively, form azeotropes with cyclopentanone (boiling point 129.5° C.) boiling at approximately 127° and 127.8° C., respectively. Any mixture of these compounds cannot be further concentrated even by careful fractionation, with respect to all or most of the components thereof, because of the extremely close boiling points of such components throughout a relatively wide composition range. This fact is demonstrated by the graph in Figure 1, the curves of which are based upon the observed vapor liquid equilibria of cyclopentanone-3-methyl-1-butanol mixtures ranging from 0 per cent cyclopentanone to 100 per cent cyclopentanone at 750 mm. Curve A represents the composition of the vapor above the boiling liquid mixture, while curve B refers to a mixture in which the composition of the vapor and of the liquid is the same at any concentration. The point of intersection of curves A and B indicates that at the composition indicated by said intersection (61 mol per cent cyclopentanone), an azeotrope with 3-methyl-1-butanol is formed.

While the problem of separating cyclopentanone from either or both of the two aforesaid branched chain C5 alcohols can occur in connection with numerous purification procedures, one of the principal instances where an efficient method for the separation of these compounds from one another is most urgently needed is in their recovery, along with other chemicals, from both the water and oil fractions produced by the reduction of carbon monoxide with hydrogen in the presence of a fluidized alkali promoted iron catalyst under known synthesis conditions. The magnitude of this problem may be more fully appreciated when it is realized that in hydrocarbon synthesis plants designed for commercial operation, and having a capacity of 6,000 barrels per day of liquid hydrocarbons, there are produced in the water stream alone 3,150 pounds of amyl alcohols per day of which about 800 pounds consists of 2-methyl-1-butanol and 3-methyl-1-butanol, and about 1,100 pounds per day of cyclopentanone and 2-methyl-cyclopentanone of which about 700 pounds consists of cyclopentanone. Both classes of these compounds are found in the oil stream in even greater amounts than they normally occur in the aqueous fraction. Specifically, mixtures of these alcohols and ketones obtained from the water stream usually contain from about 12 to 15 per cent cyclopentanone, 6 to 10 per cent 2-methylcyclopentanone, 40 to 50 per cent n-pentanol, 7 to 10 per cent 2-methyl-1-butanol and 8 to 11 per cent 3-methyl-1-butanol together with about 20 to 25 per cent of a high-boiling residue, 40 to 50 per cent of which consists of various carbonyl fractions. Mixtures of this type can generally be separated initially into three fractions, i. e., (1) a portion consisting chiefly of 2-methyl-1-butanol, 3-methyl-1-butanol and cyclopentanone boiling from about 121° to about 134° C.; (2) a fraction of n-pentanol and 2-methylcyclopentanone boiling from about 134° to about 138° C. and (3) a fraction consisting of compounds boiling above about 138° to 140° C. The separation of n-pentanol from 2-methylcyclopentanone is a formidable problem in itself; however, the procedure or procedures employed for effecting this separation lie outside the scope of our invention, and, accordingly, the discussion which follows will be confined chiefly to our process for separating cyclopentanone from 2-methyl-1-butanol and/or 3-methyl-1-butanol. Generally, further distillation of the first two fractions mentioned is ineffective to separate the components thereof owing to the fact that azeotropes are formed in each instance. In this connection, it is to be understood in the description which follows that for the purposes of this invention, 2-methyl-1-butanol and 3-methyl-1-butanol are to be regarded as equivalents, inasmuch as the solubility of these compounds in water is substantially the same and because of the extremely close boiling azeotropes which each of these alcohols forms with cyclopentanone. In addition, these alcohols boil within 3° C. of one another and, hence, cannot be satisfactorily separated from one another even by some of the more efficient fractionation techniques.

Attempts have been made previously to separate the aforesaid alcohols from cyclopentanone and from 2-methylcyclopentanone and n-pentanol in which the original crude mixture containing these alcohols and ketones was first distilled up to a temperature of about 87° C. Thereafter a second fraction boiling from 87° to 138° C. was collected, after which the resulting distillate was azeotropically distilled with water until the overhead being obtained was substantially free of ketones. Distillation of the mixture under such conditions yielded a bottoms of n-pentanol and an overhead fraction containing 2-methyl-1-butanol, 3-methyl-1-butanol, cyclopentanone, 2-methylcyclopentanone and a small amount of n-pentanol. This overhead fraction was distilled until all of the water had been removed, after which the resulting dry mixture of alcohols and ketones was subjected to distillation under a pressure of about 40 mm. By this operation, however, a sizeable fraction boiling from about 54° to about 62° C. (40 mm.) was obtained which contained the bulk of the 2-methyl-1-butanol and the 3-methyl-1-butanol together with a large portion of both ketones which passed overhead along with the alcohols. In order to effect a separation between these alcohols and ketones, the distillate collected at 54° to 62° C. (40 mm.) was subjected to distillation at atmospheric pressure whereby there were obtained two overhead fractions; one boiling at 130° C., and the other at about 138° to 140° C. The fraction boiling at 130° C. contained approximately 90 per cent alcohols (2-methyl-1-butanol and 3-methyl-1-butanol) but was still contaminated by about 10 per cent of ketones. In addition to the fact that a relatively impure alcohol fraction and an entirely unsatisfactory cyclopentanone fraction were obtained, the above procedure suffered from the disadvantage that considerable mechanical losses of materials occurred and the heat sensitive ketones were polymerized owing to the substantial number of distillation steps involved. Further distillation of the branched chain C₅ alcohol-cyclopentanone mixture at 130 C. (760 mm.) was ineffective to further separate the two C₅ alcohols from cyclopentanone.

Accordingly, it is an object of our invention to provide a convenient and economical method for separating cyclopentanone from 2-methyl-1-butanol and/or 3-methyl-1-butanol. It is a further object of our invention to provide a process by which cyclopentanone or either of the two alcohols, or both of them, can be recovered in highly purified form by means of extractive distillation. While cyclopentanone and one or both of the two aforesaid branched chain C₅ alcohols can be secured in substantially pure form, it is likewise an object of our invention to provide a process for removing the alcohol component of the azeotrope substantially free from contamination by cyclopentanone.

The present invention is concerned with the surprising discovery that cyclopentanone possesses a uniquely high solubility in water as compared to 2-methyl-1-butanol and 3-methyl-1-butanol, with which it forms azeotropes, and also compared to its adjacent homologue, 2-methylcyclopentanone. The table below compares the solubilities in water of cyclopentanone, 2-methylcyclopentanone, 2-methyl-1-butanol and 3-methyl-1-butanol at various temperatures.

| Compound | Temp., °C. | Weight Percent Solubility in Water |
|---|---|---|
| Cyclopentanone | 90 | 27.0 |
| Do | 25 | 29.7 |
| 2-Methylcyclopentanone | 25 | 5.8 |
| Do | 94 | 4.5 |
| 2-Methyl-1-Butanol | 20 | 3.2 |
| Do | 95 | 2.6 |
| Do | 25 | 2.7 |

In carrying out the process of our invention, a mixture of the crude C₅ alcohols contaminated with cyclopentanone, together with, for example, n-pentanol and 2-methylcyclopentanone, and having a composition similar to that generally outlined above, is first subjected to distillation in order to remove therefrom objectionable light impurities boiling up to about 121° C. The residue from the foregoing operation is then distilled over a temperature range of from about 121° to about 134° C. The resulting fraction, boiling within the aforesaid range, is then subjected to extractive distillation with water in accordance with the conditions of our invention as taught herein. The quantity of water employed in such distillation determines the component to be taken overhead, and we have further observed that the quantity of water employed to obtain such results is very critical.

This phenomenon is illustrated in the graph of Figure 2 which shows the relative volatility of cyclopentanone with respect to 3-methyl-1-butanol in varying water concentrations. Curve A represents the relative volatilities (frequently referred to as "alphas") obtainable by varying the water content of a 30 weight per cent cyclopentanone-70 weight per cent 3-methyl-1-butanol mixture from 0 to about 91 weight per cent, while curve B shows the same thing for a mixture containing 80 weight per cent cyclopentanone and 20 weight per cent 3-methyl-1-butanol. The shaded area between the two curves shows the relative volatilities obtainable at different water concentrations with cyclopentanone-3-methyl-1-butanol mixtures having compositions intermediate those represented by curves A and B. The graph also indicates the water concentration that must be maintained in the distillation zone in order to obtain the required relative volatilities necessary to effect the separation desired. Generally speaking, the relative volatility figure should be at least 1.15 in order to secure an appreciable separation of the components of the mixture, and preferably about 1.2 to render the procedure practical. Thus, it may be seen from the graph that with water concentrations up to about 15 weight per cent, no separation of the ketone from the alcohols, or vice versa, can be expected. At or above 15 weight per cent, e. g. 20 weight per cent, the relative volatility of cyclopentanone to 3-methyl-1-butanol, when these compounds are present in a weight ratio of 3 to 7, is about 1.2 which makes possible the recovery of a relatively pure branched chain C₅ alcohol bottoms fraction. However, the overhead which is becoming richer in cyclopentanone approaches a relative volatility of 1.0, indicating that the separation of 3-methyl-1-butanol present in this fraction is becoming more difficult, and, hence, that such overhead portion will be contaminated with the branched chain C₅ alcohol or alcohols. This condition holds true for operations employing water concentrations in the distillation zone of from about 15 to about 40 weight per cent. Above 40 weight per cent to about 55 weight per cent, relatively good separation of the alcohols from the ketone, and vice versa, can be secured. Thereafter from above 55 weight per cent to about 70 weight per cent water, again only relatively pure branched chain C₅ alcohol can be obtained in the bottoms while the overhead which has become enriched with respect to cyclopentanone approaches a relative volatility value of unity, thus making a separation between the ketone and the alcohol extremely difficult in the water concentrations involved. The portion of the shaded area cut by water concentrations of from above 70 to about 80 weight per cent defines conditions under which it is impossible to secure either of the components in the form of a pure overhead or bottoms fraction. In fact, in passing from water concentrations ranging from above 70 weight per cent to 80 weight per cent, the relative volatility of cyclopentanone to the branched chain C₅ alcohol is reversed, the alcohol becoming the more volatile with increased concentrations of water. This phenomenon is observed to occur in water concentrations ranging from slightly above 80 weight per cent to infinite dilution. With water concentrations of at least 85 weight per cent, pure cyclopentanone is obtained in the bottoms and pure branched C₅ alcohol recovered in the overhead. Thus, it may be seen from the graph in Figure 2 that by employing a concentration of water of about 91 weight per cent in the distillation zone, it is indicated that the relative volatility of cyclopentanone to 3-methyl-1-butanol is about 0.60 in mixtures wherein the cyclopentanone is present in concentrations of 80 per cent, i. e., the weight ratio of the ketone to alcohol being 8 to 2. Expressed as the relative volatility of 3-methyl-1-butanol to cyclopentanone, this value would be 1/0.60 or 1.67. The alpha for this mixture increases as the latter approaches the bottom of the column. Accordingly, highly purified cyclopentanone can be obtained as bottoms. Likewise, it is possible to recover pure 3-methyl-1-butanol in the overhead as shown by the fact that the relative volatility of cyclopentanone to 3-methyl-1-butanol, when these compounds are present in a weight ratio of 3 to 7, is about 0.76 or a value of 1.31 when expressed in terms of relative volatility of 3-methyl-1-butanol to cyclopentanone. While it is seen from the graph that the relative volatility of a composition containing in excess of 70 weight per cent 3-methyl-1-butanol (dry basis) tends to decrease as it approaches the pure alcohol, where water concentrations of the order of 91 weight per cent are employed, it is indicated that a composition consisting of pure alcohol will be reached having a relative volatility of about 0.8 (cyclopentanone to 3-methyl-1-butanol); or, expressed in terms of the volatility of the alcohol to cyclopentanone, a value of 1.25 is realized which is still ample to permit sharp separation between the alcohol and the ketone and to recover in the overhead a pure alcohol fraction.

The extractive distillation operation itself may be effected in any conventional column having a washing or rectifying zone and a stripping zone for effective countercurrent vapor liquid contact under reboiling and refluxing conditions. Water, or other suitable extractive distillation agent, is introduced at a point near the top of the column in order to effectively alter the relative volatilities of the ketone and alcohols to be separated. Separation of these compounds is preferably effected by employing a continuous process to secure the alcohols and ketone in the desired degree of purity.

The temperature of the dilution water is generally preferably held to about the same temperature as the liquid on the plate opposite the feed point. In this connection, the use of excessive amounts of heat beyond the over-all column requirements impairs its efficiency due primarily to an unbalancing of the proper water concentrations throughout the column. The mixture of cyclopentanone and 2-methyl-1-butanol and/or 3-methyl-1-butanol fed to the column is preferably heated to a temperature approximating that of the descending column liquids under substantially equilibrium boiling conditions at the point of introduction. This preheated mixture may be in liquid form, partially vaporized or completely vaporized when introduced into the column.

As previously pointed out, the quantity of water employed in the extractive distillation operation determines both the purity of the materials obtained from either end of the column and whether such materials are recovered as overhead or as bottoms. Thus, where the recovery of 2-methyl-1-butanol and 3-methyl-1-butanol is preferable, and the purity of the cyclopentanone stream relatively unimportant, this object can be accomplished by employing concentrations of water in the distillation zone ranging preferably from about 20 to about 70 weight per cent. Under these conditions, 2-methyl-1-butanol and/or 3-methyl-1-butanol in highly purified form are separated as bottoms in good yields from cyclopentanone which is taken overhead together with a relatively small fraction of the alcohols. By using water concentrations of from about 40 to about 55 weight per cent, an overhead cyclopentanone fraction and a bottoms alcohols fraction can be secured which contain, respectively, a substantially increased ratio of ketone and alcohols over the concentrations of these components present in the feed mixture. With water concentrations of about 85 weight per cent and above, both the ketone and alcohols fractions can be secured in a high degree of purification; however, under such conditions of dilution, the cyclopentanone is withdrawn as bottoms and the alcohols recovered as an overhead fraction.

One of the outstanding and surprising features of our invention is the behavior of cyclopentanone with varying concentrations of water. Thus, while this ketone is much more soluble than either of the two aforesaid branched chain C₅ alcohols, it is not extracted by water at water concentrations in the distillation zone ranging from about 20 to about 70 weight per cent. However, at water concentrations of from about 85 weight per cent to infinite dilution, a reversal of the phenomenon occurs. A further surprising fact is that with water concentrations ranging from above about 70 to about 80 weight per cent, a "blind spot" in the separation process occurs, i. e., the relative volatility of the ketone and alcohols under such conditions converge to values which render satisfactory separation of either or both of these classes of compounds impossible.

From the foregoing description it may be seen that by employing the now generally known technique of extractive distillation, we are able to separate any mixture of cyclopentanone and 2-methyl-1-butanol and/or 3-methyl-1-butanol into a highly purified alcohols fraction or into both highly purified ketone and alcohols fractions merely by maintaining the quantity of water or other extractive distillation agent supplied to the distillation zone within certain specific ranges of concentration.

What we claim is:

1. In a process for the recovery of cyclopentanone from a mixture of at least one of the alcohols 2-methyl-1-butanol and 3-methyl-1-butanol, the steps which comprise subjecting said mixture to fractionation in a distillation zone, maintaining in said zone a concentration of water ranging from about 20 to about 70 weight per cent, and recovering a bottoms containing at least one of the alcohols 2-methyl-1-butanol and 3-methyl-1-butanol substantially free from cyclopentanone.

2. The process of claim 1 in which 3-methyl-1-butanol is the sole alcohol present in the mixture subjected to fractionation.

3. The process of claim 1 in which 2-methyl-1-butanol is the sole alcohol present in the mixture subjected to fractionation.

4. In a process for the separation of cyclopentanone from at least one of the alcohols 2-methyl-1-butanol and 3-methyl-1-butanol, the steps which comprise subjecting a mixture of the aforesaid ketone and alcohols to fractionation in a distillation zone, maintaining in said zone a concentration of water ranging from about 40 to about 55 weight per cent, recovering an overhead fraction containing cyclopentanone in an increased ratio to the aforesaid alcohols and withdrawing a bottoms containing at least one of the alcohols 2-methyl-1-butanol and 3-methyl-1-butanol in increased ratio to said cyclopentanone.

5. The process of claim 4 in which 2-methyl-1-butanol is the sole alcohol present in said mixture.

6. The process of claim 4 in which 3-methyl-1-butanol is the sole alcohol present in said mixture.

7. In a process for the separation of cyclopentanone from at least one of the alcohols 2-methyl-1-butanol and 3-methyl-1-butanol, the steps which comprise subjecting a mixture of the aforesaid ketone and alcohols to fractionation in a distillation zone, maintaining in said zone a concentration of water of at least 85 weight per cent, withdrawing an overhead fraction containing at least one of the alcohols 2-methyl-1-butanol and 3-methyl-1-butanol and recovering a bottoms fraction of cyclopentanone.

8. The process of claim 7 in which 2-methyl-1-butanol is the sole alcohol present in said mixture.

9. The process of claim 7 in which 3-methyl-1-butanol is the sole alcohol present in said mixture.

THEODORE Q. ELIOT.
JOE C. WEAVER, Jr.

References Cited in the file of this patent

UNITED STATES PATENTS

| Number | Name | Date |
|---|---|---|
| 2,551,625 | Morrell et al. | May 8, 1951 |
| 2,568,522 | Steitz et al. | Sept. 18, 1951 |
| 2,591,714 | Morrell | Apr. 8, 1952 |
| 2,552,911 | Steitz | May 15, 1951 |

OTHER REFERENCES

Horsely, "Table of Azeotropes and Non-azeotropes," Analytical Chemistry, vol. 19, page 510 (1947), and vol. 21, page 832 (1949).